F. J. SINGER.
RADIATOR.
APPLICATION FILED JUNE 13, 1917.
1,286,433.
Patented Dec. 3, 1918.
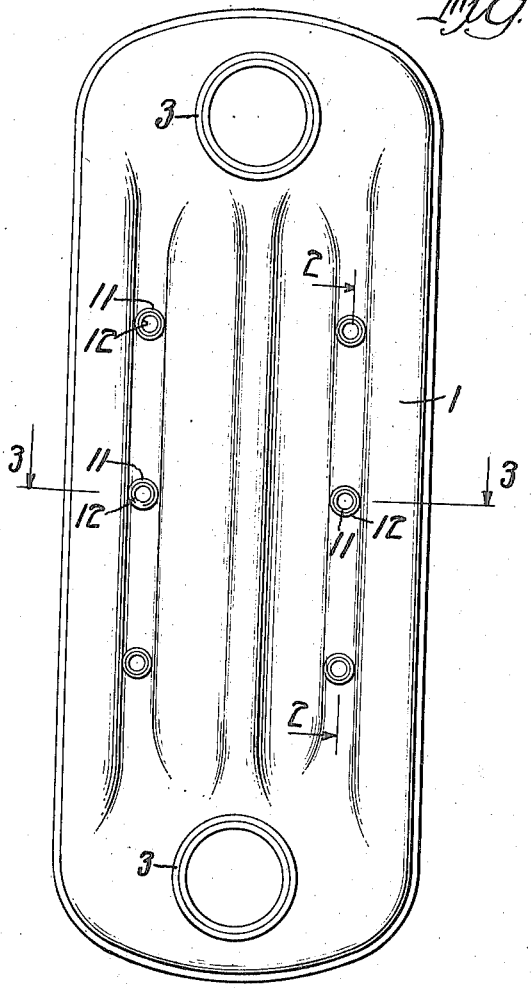
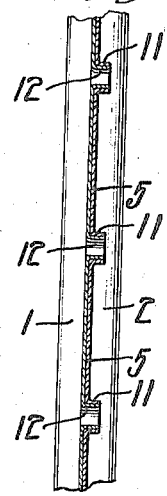
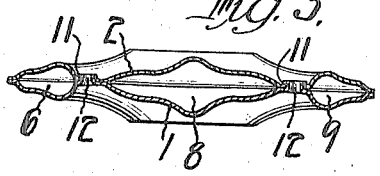
Inventor
Frank J. Singer,

UNITED STATES PATENT OFFICE.

FRANK J. SINGER, OF DETROIT, MICHIGAN, ASSIGNOR TO AMERICAN PRESSWELD RADIATOR CORPORATION, OF DETROIT, MICHIGAN, A CORPORATION OF DELAWARE.

RADIATOR.

1,286,433.

Specification of Letters Patent.   Patented Dec. 3, 1918.

Application filed June 13, 1917.   Serial No. 174,470.

*To all whom it may concern:*

Be it known that I, FRANK J. SINGER, a citizen of the United States, and residing at Detroit, in the county of Wayne and State of Michigan, have invented a new and Improved Radiator, of which the following is a specification.

In the manufacture of sheet metal radiators it is customary to join the half sections at their edges by welding with a blow pipe. It is also necessary, in order to prevent bulging, to connect the half sections at points intermediate between their edges, the custom being to either employ rivets for this purpose or to make the connection by spot welding. Because of the constantly varying conditions of temperature and moisture, however, it is very difficult to secure and maintain a tight joint by any construction of which riveting is the basis, and the lack of uniformity in the spot welding process, as well as the danger of burning the sheets at the welding points, also renders this construction unreliable.

To the end of overcoming the above and other objections to prior radiators of this type, the present invention consists in a radiator section having its halves connected together by punching or otherwise forming tubular flanges on the sections, one of the flanges being arranged to be received within the other and both projecting from the wall of the section at one side, and thereafter welding the edges of the flanges together. This construction lends itself readily to commercial processes of manufacture, and both provides a tight seal (which is substantially unaffected by changes in temperature or varying moisture conditions) and affords a rigid connection whereby the halves are fully braced against spreading apart and against shear.

In the drawings, Figure 1 is a side view of a radiator section in which my invention is embodied. Figs. 2 and 3 are sections on the lines 2—2 and 3—3 of Fig. 1.

The thin sheet metal halves 1 and 2 of a given section are preferably joined at their edges by welding with a blow pipe, and are provided with suitable perforated bosses 3 perforated and properly reinforced for connection to an adjacent section or to the pipes of the supply system. As shown, the sections bear upon one another at points intermediate their edges along flat faces 5 to form three longitudinal chambers 6, 8 and 9, but the number of these chambers is subject to variation.

The half section 2 has projecting therefrom, along the faces 5 and on the side opposite the half section 1, tubular flanges 11, the axes of which are perpendicular to the central plane of the radiator, in other words, perpendicular to the faces 5; and the section 1 is provided with similar flanges 12. The latter are longer than the flanges 11 by an amount substantially equal to the thickness of the metal. Therefore, when the two half sections are assembled, the ends of the flanges 11 and 12 lie in substantially the same plane and, being of the same thickness, fuse at the same time when subjected to the heat of a blow pipe. In this operation there is practically no danger of burning the surrounding portion of the section, and the finished construction has proven to be much more reliable than previous constructions, as stated above.

It is evident that the invention may be applied to containers other than radiator sections; I do not, therefore, wish to be limited otherwise than as indicated by the subjoined claims.

I claim:—

1. A container comprising two sheet metal halves joined at their edges by a tight joint, said halves being shaped intermediate their edges to form flat surfaces which substantially bear upon each other, one of the halves having along the flat surface a tubular flange, the axis of which is at substantially right angles to the plane of the flat surfaces, the other half including a similar tubular flange of lesser diameter and of greater length than the first mentioned flange, the second flange being received within the first mentioned flange, the edges of the flanges being welded together externally of the container.

2. A radiator section comprising two metal sheets of equal thickness joined at their edges by a tight joint, the sheets bearing upon one another at a point between said edges, each of the sheets having a tubular flange, the flange on one sheet being received closely within the flange of the other sheet, the ends of the flanges lying in substantially the same plane and being welded to each other externally of the radiator.

3. A container comprising two metal sheets of equal thickness joined at their edges by a tight joint, the sheets having alined tubular flanges, one of the flanges being received within the other, said flanges terminating in a common plane and being welded to each other throughout their edges externally of the container.

FRANK J. SINGER.